US007653175B2

(12) United States Patent
Gordon, III et al.

(10) Patent No.: US 7,653,175 B2
(45) Date of Patent: Jan. 26, 2010

(54) RADIOGRAPHIC INSPECTION SYSTEM AND METHOD

(75) Inventors: Clarence L. Gordon, III, Glenville, NY (US); Manoharan Venugopal, Bangalore (IN); Debasish Mishra, Clifton Park, NY (US); Raghu Chatanathodi, Calicut (IN); Richard Henry Bossi, Renton, WA (US); Michael Craig Hutchinson, Kent, WA (US)

(73) Assignees: General Electric Company, Niskayuna, NY (US); The Boeing Company, Chicago, IL (US)

( * ) Notice: Subject to any disclaimer, the term of this patent is extended or adjusted under 35 U.S.C. 154(b) by 99 days.

(21) Appl. No.: 11/864,315

(22) Filed: Sep. 28, 2007

(65) Prior Publication Data

US 2009/0086914 A1 Apr. 2, 2009

(51) Int. Cl.
*G01N 23/04* (2006.01)

(52) U.S. Cl. ............................ 378/57; 378/51; 378/207

(58) Field of Classification Search ................... 378/37, 378/51, 53, 54, 57, 58, 64
See application file for complete search history.

(56) References Cited

U.S. PATENT DOCUMENTS

| | | | | |
|---|---|---|---|---|
| 6,222,907 | B1 | 4/2001 | Gordon, III et al. | |
| 6,272,207 | B1 | 8/2001 | Tang | |
| 6,408,049 | B1 | 6/2002 | Edic et al. | |
| 6,594,338 | B2 | 7/2003 | Darboux et al. | |
| 2002/0141541 | A1 | 10/2002 | Darboux et al. | |
| 2009/0086911 | A1 * | 4/2009 | Venugopal et al. | 378/96 |

FOREIGN PATENT DOCUMENTS

JP 2002148213 A * 5/2002

OTHER PUBLICATIONS

English language translation of Tominaga et al. (JP 2002-148213 A).*

* cited by examiner

*Primary Examiner*—Edward J Glick
*Assistant Examiner*—Mona M Sanei
(74) *Attorney, Agent, or Firm*—Penny A. Clarke

(57) ABSTRACT

A system is provided for radiographic inspection of an object comprising multiple having different material properties. The system comprises a radiation source configured to generate radiation, a display unit for generating a graphical user interface (GUI) including multiple fields. A user enters input data via the fields in the GUI. The input data relates to one or more material properties for each of the regions. A processor is configured to compute a plurality of exposure parameters based on the input data.

15 Claims, 5 Drawing Sheets

RADIOGRAPHIC INSPECTION SYSTEM AND METHOD

BACKGROUND

The invention relates generally to inspection systems and more specifically to an inspection planning tool for a radiographic inspection system.

Radiographic inspection of industrial parts is desirable. However, composite parts comprising multiple materials present certain challenges for radiographic inspection. Conventionally, in radiographic inspection systems, a beam of high-energy radiation, such as X-rays, is transmitted through a test object to be inspected, and a corresponding image of the test object is formed using various image processing techniques. A flaw, defect or structural inhomogeneity in the test object is detected by examining the image generated.

For accurate examination of the generated image, it is often required to generate the image with a desired gray level. To obtain the desired gray level in the image, the radiation source needs to be initialized with suitable exposure parameters. In existing radiographic inspection systems, the desired exposure parameters are obtained after performing several trial experiments.

One problem with using the trial and error method is the corresponding increase in time required to obtain accurate parameters. Also, to inspect composite parts with multiple regions having different material properties, it would be desirable to inspect the different regions in a short period of time and with the minimum number of exposures (or shots). Since the exposure parameters may be different for the different regions, the increased time for accurately determining the exposure parameters leads to loss in productivity.

In addition, many inspection systems have various types of radiation sources that are adapted for inspecting specific types of objects. Using a trial and error method to calculate the exposure parameters for each type of source and for the different regions within a composite article could be a cumbersome task.

Therefore, it is desirable to implement a technique that is capable of automatically determining exposure parameters for various radiation sources based on the object being inspected. Further, it would be desirable for the technique to be capable of automatically determining the exposure parameters for a composite article having multiple regions with different material properties.

BRIEF DESCRIPTION

Briefly, in accordance with one embodiment, a system is provided for radiographic inspection of an object comprising multiple regions having different material properties. The system comprises a radiation source configured to generate radiation, and a display unit for displaying a graphical user interface comprising a plurality of fields. A user enters input data related to one or more material properties for each region of the object into the fields. The system further includes a processor configured to compute a plurality of exposure parameters based on the input data.

In another embodiment, a method is provided for radiographic inspection of an object comprising multiple regions having different material properties. The method comprises irradiating the object with radiation, generating a graphical user interface comprising a plurality of fields, providing a thickness of each region of the object being inspected in respective ones of the fields, entering one or more material properties for each region into respective ones of the fields, and computing a plurality of exposure parameters based on the thicknesses and the material properties of multiple regions within the object.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
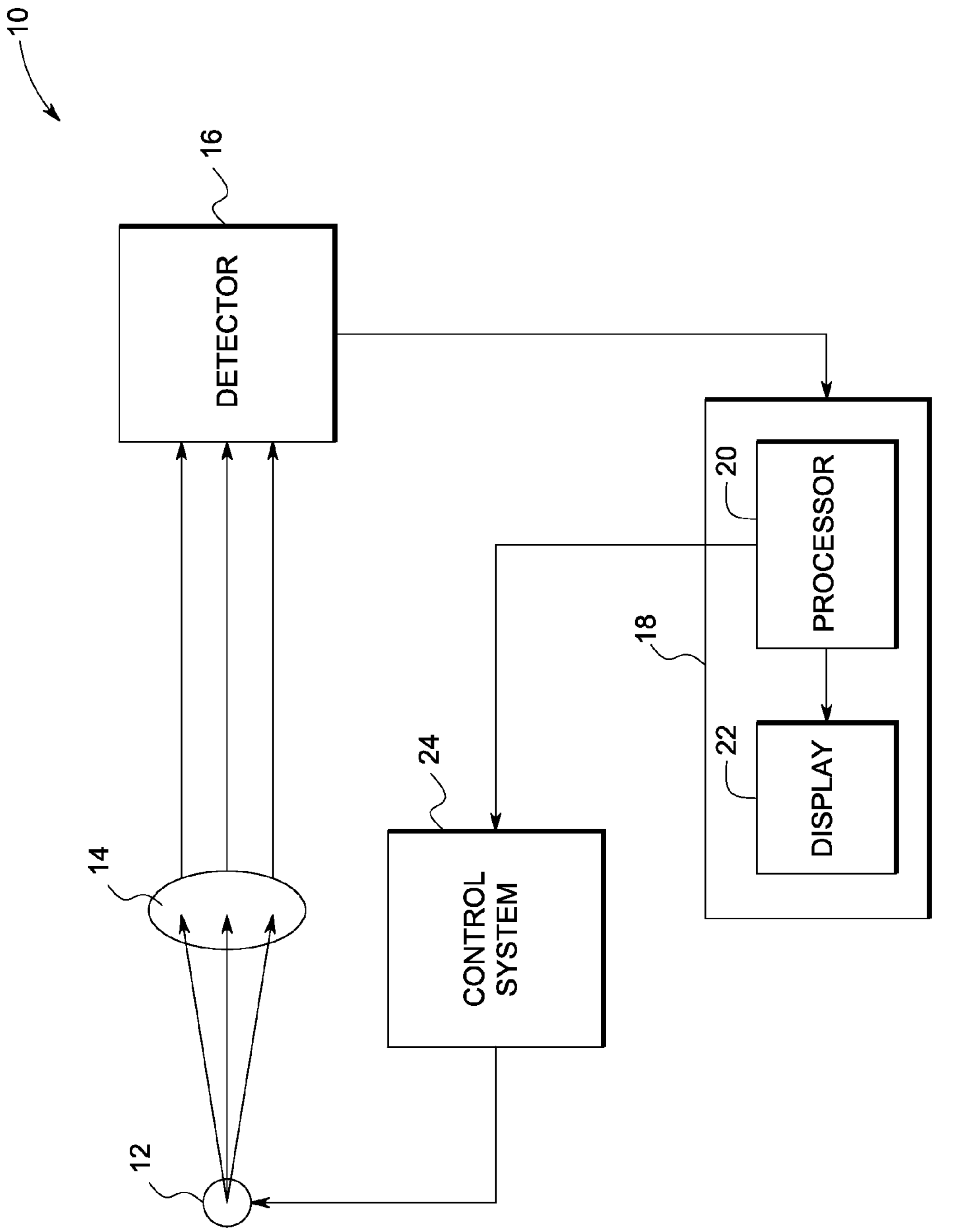
FIG. 1 is a block diagram of an exemplary embodiment of an inspection system implemented according to one aspect of the invention.

FIG. 1 is a block diagram of one embodiment of a radiographic inspection system implemented in accordance with one aspect of the invention. Radiographic inspection system 10 comprises a radiation source 12, a detector 16, a processor 20 and a control system 24. Each component is described in further detail below.

As used herein, “adapted to”, “configured” and the like refer to mechanical or structural connections between elements to allow the elements to cooperate to provide a described effect; these terms also refer to operation capabilities of electrical elements such as analog or digital computers or application specific devices (such as an application specific integrated circuit (ASIC)) that are programmed to perform a sequel to provide an output in response to given input signals.

Figure 5:
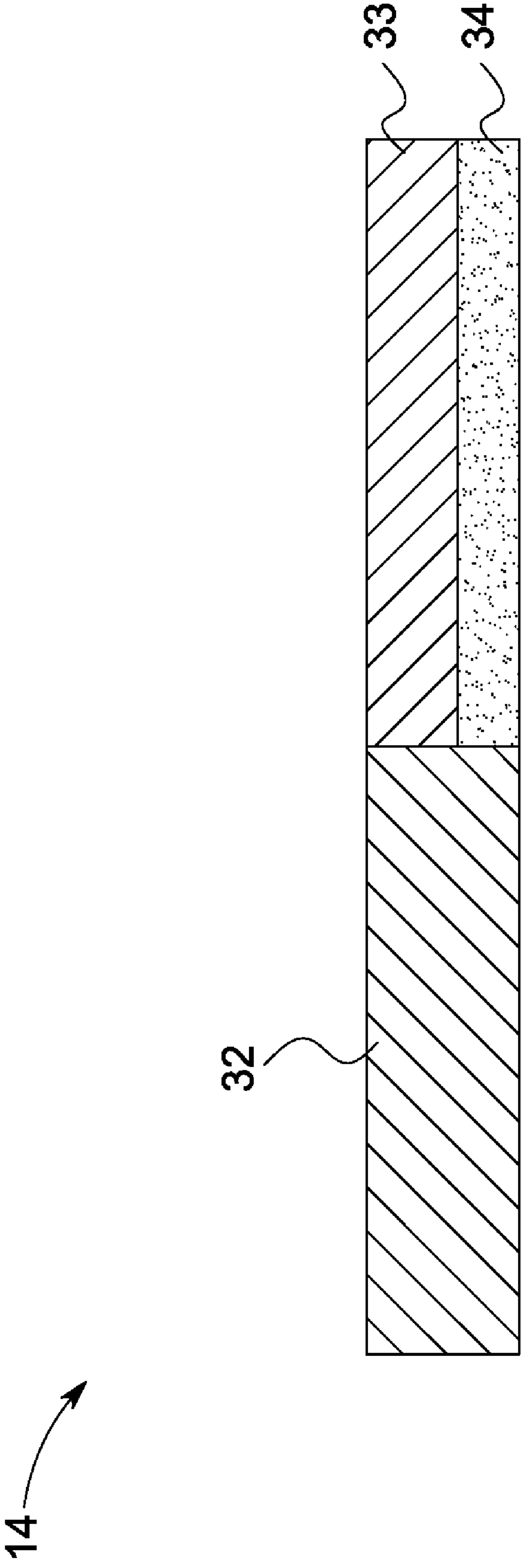
FIG. 5 schematically depicts a composite article having multiple regions with different material properties.

Radiation source 12 is configured to generate high energy radiation to irradiate an object 14. In one embodiment, the radiation source is an X-ray source. The exposures parameters of the radiation source are initialized based on the object being inspected. In particular for a composite article comprising multiple regions having different material properties, the exposure parameters of the radiation source are determined for the different regions 32, 33, and 34. FIG. 5 schematically depicts an example composite article 14. This figure is for purposes of illustration only and is not intended to depict an actual composite article. The system and method described herein are applicable to a variety of composite articles 14 having multiple regions 32, 33 and 34 with different material properties, and the invention is not limited to the inspection of any particular composite article. In the illustrated example, region 32 comprises a carbon based composite material (for example, a resin infused carbon perform), and region 33 comprises a metal. Each of the regions may further comprise additional materials. For example, in the illustrated example, the region 34 further comprises a composite material, and the composite material and the metal form vertically arranged layers within the second region. Exposure parameters of the radiation source include a current input parameter and a voltage input parameter.

Detector 16 is configured to receive the radiation energy passing through the object. The detector is configured to convert the received radiation into corresponding electrical signals. In one embodiment, the detector is a small area detector, such as a charge-coupled device. In one example, the small area detector has an area of less than about 10.2 centimeters (cm)×10.2 centimeters (cm), with a weight that is less than about 2.27 kg.

Computer system 18 comprises a processor 20 and a display unit 22. The processor is configured to implement a radiographic inspection tool that is adapted to receive the electrical signals from the detector and generate a corresponding image of the object. The display unit is used to display an image of the object.

The display unit is further adapted to display a graphical user interface (GUI) comprising a plurality of fields. The fields are adapted to accept input data provided by a user. Input data comprises information related to the object being inspected and/or to the radiation source and detector. For example, the user can provide information related to the thickness of different materials of the object, the type of radiation source being used, the material of the regions 15, the distance between the radiation source and a radiation detector, the magnification factor, etc. According to a particular embodiment, the input data includes data related to one or more material properties for each region of the composite article 14. The processor 20 is configured to calculate the exposure parameters for the radiation source based on the input data, which will result in generating an image with a desired gray level. An example GUI is discussed below with reference to FIG. 3.

According to a more particular embodiment, the processor is configured to compute the exposure parameters for each region of the composite article 14. In a more particular embodiment, the processor is further configured to determine an overlap between the exposure parameters for the regions and to select a plurality of exposure parameter values within the overlap for use in inspecting the object. Beneficially, by selecting exposure parameter values within the overlap, the different regions of the composite article can be inspected in single exposure, thereby reducing both the inspection time and the radiation exposure. For example, if one region requires 20-35 kV and a second region requires 30-40 kV, the optimum technique would be 30-35 kV to image both areas.

Control system 24 receives the computed exposure parameters from the computer system and is configured to automatically set the exposure parameters of the radiation source based on the input data provided by the user. For a particular embodiment, control system 24 initializes the radiation source 12 based on the selected exposure parameter values to inspect the regions of the composite article 14 with a single exposure, thereby reducing both the inspection time and the radiation exposure. The manner in which the processor computes the exposure parameters of the radiation source is described in further detail below.

Figure 2:
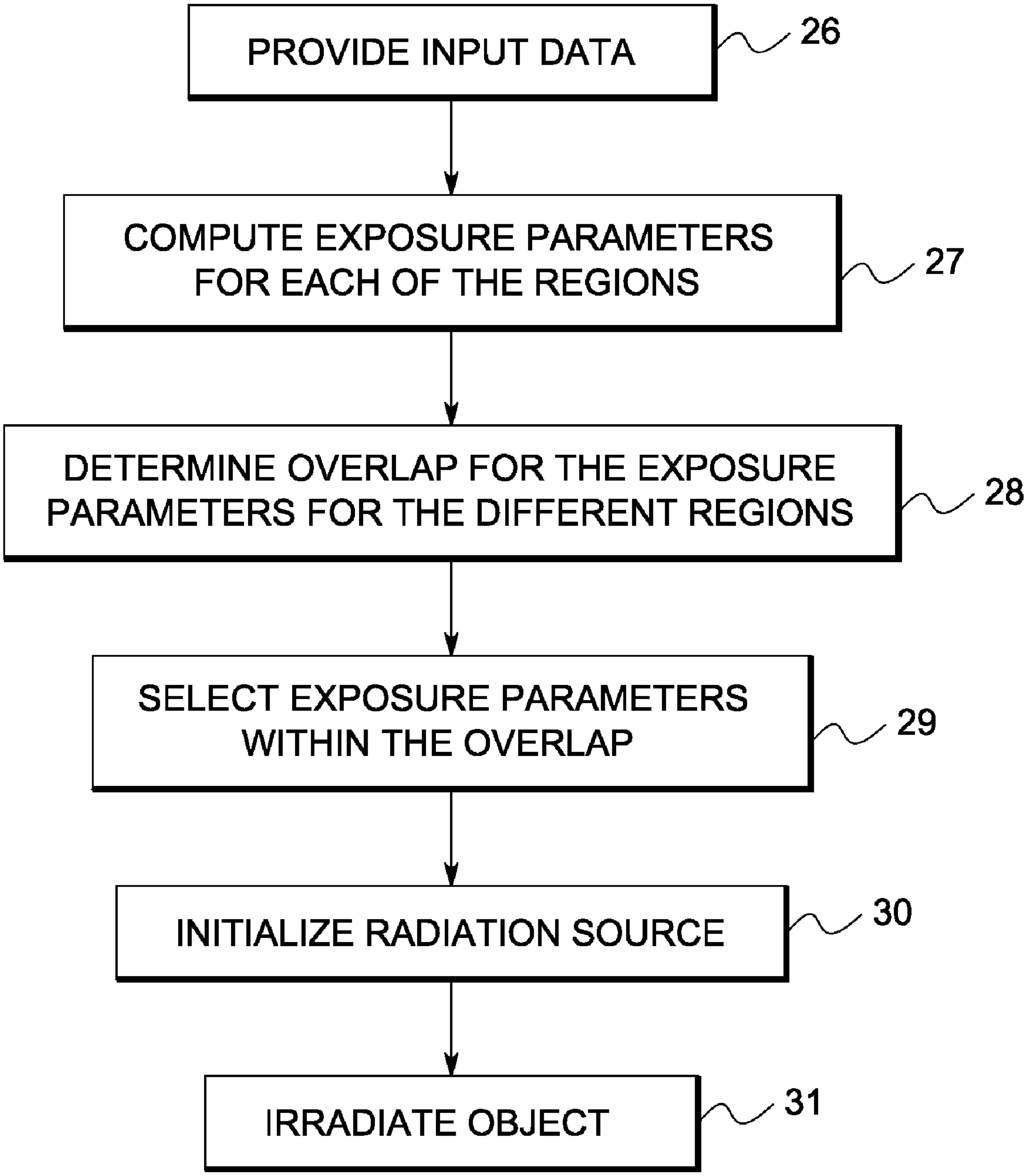
FIG. 2 is a flow chart illustrating a method by which an object is inspected according to an aspect of the invention.

FIG. 2 is a flow chart illustrating a method by which an object with multiple regions having different material properties is inspected using a radiographic inspection planning tool implemented according to an aspect of the invention. In a particular embodiment, the tool implements an algorithm that includes several steps for computing a required gray level of an image for a given set of system constraints. Each step is described in further detail below.

In step 26, a user enters input data via a graphical user interface. The input data comprises information related to the object being inspected and/or to the radiation source and detector. In a specific embodiment, the user provides the thickness and the material properties of each region of the object being inspected.

In step 27, exposure parameters are computed using the input data provided by the user. According to a particular embodiment, the exposure parameters are computed for each region in the composite article based on the thickness and material property data for each of the regions. Exposure parameters include a current input parameter and a voltage input parameter. Another example exposure parameter is the exposure time. The exposure parameters are computed such that the resulting image generated by the processor is of a desired gray level. In order to arrive at the accurate exposure parameters, the interaction of the radiation energy with the object being inspected is modeled using an x-ray spectral model. As is well known to those skilled in the art, a number of different x-ray spectral models have been developed for various medical and industrial inspection techniques.

In step 28, an overlap is determined between the exposure parameters for the different regions. In step 29, a plurality of exposure parameter values are selected within the overlap for use in inspecting the multiple region composite article.

In step 30, the radiation source is initialized with the selected exposure parameter values using a control system to inspect the multiple regions of the object 14 with a single exposure that is appropriate for each of the regions. In step 31, the object is irradiated with radiation generated by the radiation source. The selected exposure parameter values are also displayed on the graphical user interface. An exemplary graphical user interface is described in further detail below.

Figure 3:
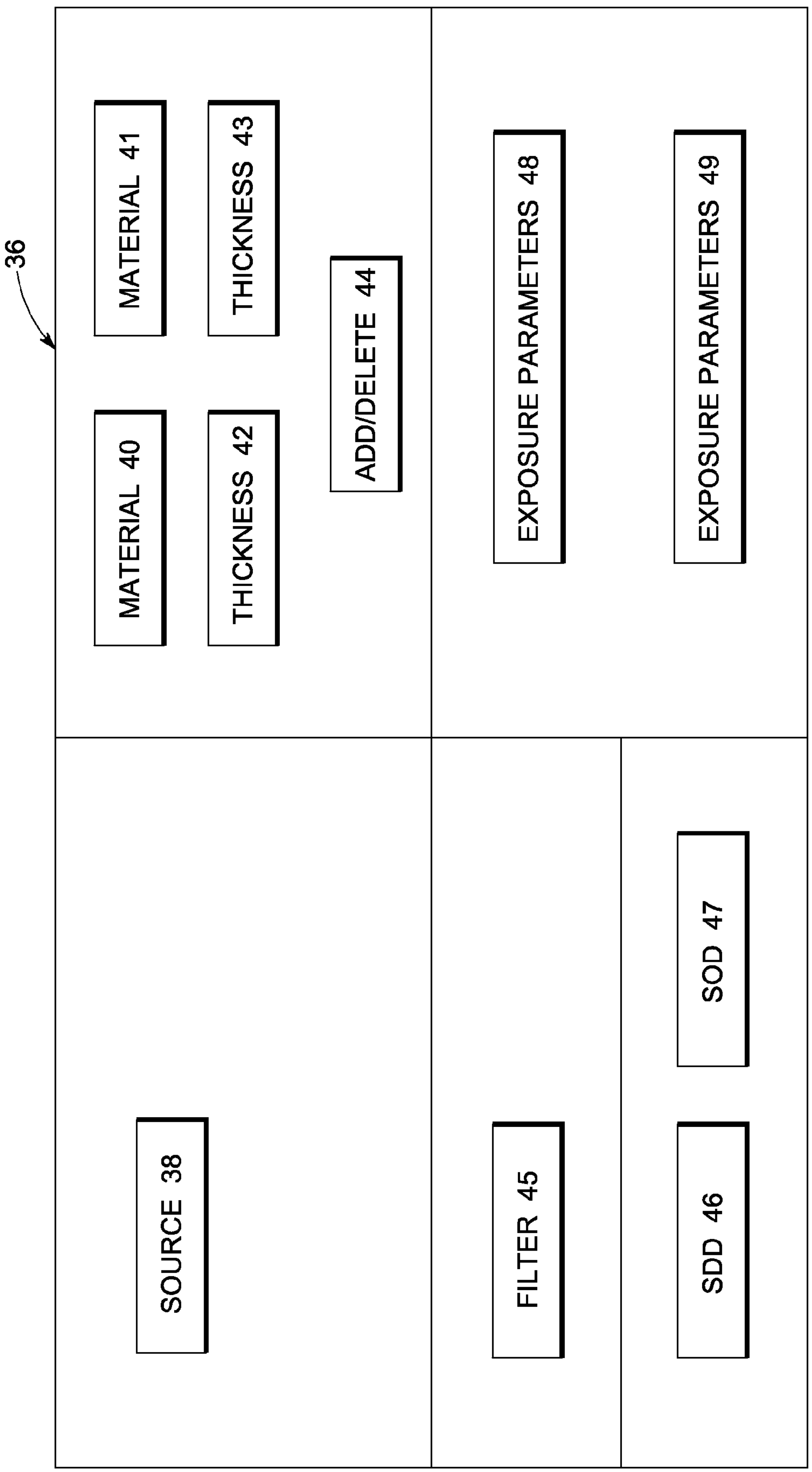
FIG. 3 is a diagrammatic view of a graphical user interface implemented according to one aspect of the invention.

FIG. 3 is a diagrammatic view of an exemplary graphical user interface (GUI) adapted for accepting input data provided by a user. This example of FIG. 3 corresponds to a composite article 14 having two regions. Example multiple regions 32, 33, and 34 are discussed above with reference to FIG. 5. Input data is related to the object, the radiation source and/or the radiation detector. The input data is in turn used as system constraints while computing the exposure parameters.

GUI 36 comprises a plurality of fields configured to accept input data related to the radiation source, the detector and the object. For example, field 38 is configured to accept input data related to the type of radiation source being used. In one embodiment, field 38 comprises a drop down menu that includes the various types of X-ray sources that are used in industrial applications.

As noted above, the example GUI shown in FIG. 3 may be used for a composite article having two regions. Fields 40-44 is configured to accept input data regarding the object being inspected. In the illustrated example, the user provides the materials for the two regions in fields 40 and 41. In a more specific embodiment, a standard list of materials comprising elements, alloys and composites are displayed to enable a user to select the materials of interest for each region of the composite article. In the illustrated example, the user enters the thickness of each of the regions of the composite object being inspected in fields 42 and 43. The GUI is also designed such that new material data can be added or deleted when required as shown in field 44.

Additionally, the GUI also enables a user to provide input data related to the detector. For example, the user may provide source to detector distance in field 46 and source to object distance in field 47. Also, the GUI accepts data in field 45, related to any external filters, if employed by the inspection tool.

On entering the input data, the exposure parameters are displayed in fields 48 and 49. The exposure parameters include a current input parameter and a voltage input parameter. In a specific embodiment, the radiographic inspection tool is adapted to generate multiple sets of exposure parameters for composite object comprising multiple regions with different material properties. For example, for a composite article comprising two regions with different material properties, the radiographic inspection tool generates two sets of exposure parameters, with each of the sets being optimized for a respective one of the regions. As discussed above, an overlap between the sets of exposure parameters is then determined, and exposure parameter values with the overlap are then selected for inspection of the composite article with a single exposure that is appropriate for each of the regions.

The exposure parameters are calculated as described in the flow chart of FIG. 2. In a more particular embodiment, an optimization algorithm is additionally employed to determine optimum exposure parameters. The optimization algorithm is described in further detail below.

Figure 4:
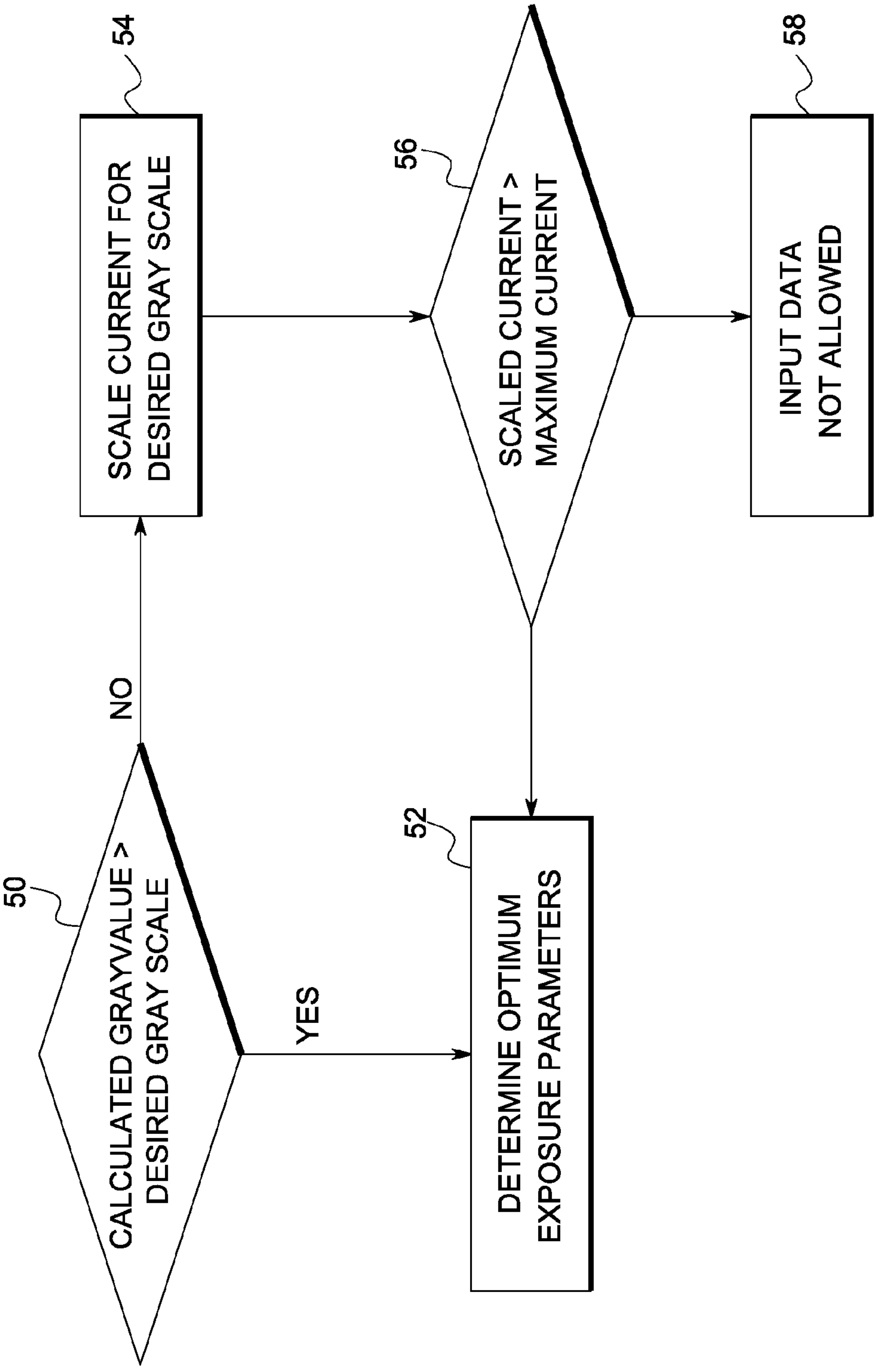
FIG. 4 is a flow chart illustrating an optimization algorithm implemented according to one aspect of the invention.

FIG. 4 is a flow chart illustrating an example optimization algorithm used to determine exposure parameters for each of the regions of the composite article to obtain a required gray level. The optimization algorithm is configured to generate exposure parameters based on a desired gray level and system constraints. In one embodiment, the desired gray level is 2000 counts. The manner in which the optimization algorithm is employed is described below in detail.

In step 50, a feasibility analysis is performed to determine if the desired gray level for the image can be achieved with input data provided by the user. In one embodiment, the input data comprises data related to the radiation source. The feasibility analysis is performed by calculating the gray value using the input data.

If the calculated gray value exceeds the desired gray level, the algorithm generates optimum exposure parameters for the given input data as shown in step 52. If the calculated gray value is less than the desired gray value, then the current is scaled for the desired gray scale as shown in step 54.

In step 56, the scaled current is then compared to a maximum current rating of the radiation source. If the scaled current exceeds the maximum current rating, the algorithm specifies to the user that the input data provided cannot be allowed on the inspection system as shown in step 58. If the scaled current does not exceed the maximum current, then the optimization algorithm calculates the exposure parameters for the given input data as shown in step 52.

The above described invention provides several advantages including accurate determination of exposure parameters and a substantial reduction in inspection time. In particular, the invention facilitates radiographic inspection of a composite article in a single exposure that is appropriate for each of the different regions within the article.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for radiographic inspection of an object comprising a plurality of regions having different material properties, the system comprising:

a radiation source configured to generate x-ray radiation;

a display unit for displaying a graphical user interface comprising a plurality of fields, wherein a user provides input data in the plurality of fields, wherein the input data relates to one or more material properties for each of the regions;

a processor configured to compute a plurality of exposure parameters based on the input data, wherein the processor is configured to compute the exposure parameters for each of the regions, to determine an overlap between the exposure parameters for the regions, and to select a plurality of exposure parameter values within the overlap for use in inspecting the object; and a control system configured to initialize the radiation source based on the selected exposure parameter values to inspect the regions of the object with a single exposure.

2. The system of claim 1, wherein the exposure parameters comprise a current input parameter and a voltage input parameter of the radiation source.

3. The system of claim 1, further comprising a small area detector configured to receive the x-ray radiation passing though the object.

4. The system of claim 1, wherein the processor is further configured to generate a plurality of optimum exposure parameters using an optimization algorithm that is modeled on a plurality of types of radiation sources and a small area-radiation detector.

5. The system of claim 1, wherein a first one of the regions comprises a carbon based composite material and a second one of the regions comprises a metal.

6. The system of claim 5, wherein the second region further comprises a composite material, and wherein the composite material and the metal are form vertically arranged layers.

7. The system of claim 1, wherein the input data further comprises at least one of a thickness of each of the regions, a type of radiation source, a distance between the radiation source and a radiation detector and a magnification factor.

8. A method for radiographic inspection of an object comprising a plurality of regions having different material properties, the method comprising:

irradiating the object with x-ray radiation;

generating a graphical user interface comprising a plurality of fields, entering a thickness of each of the regions of the object being inspected in respective ones of the plurality of fields;

entering one or more material properties for each of the regions into respective ones of the fields;

computing a plurality of exposure parameters based on the thicknesses and the material properties of the regions, wherein the exposure parameters are computed for each of the regions;

determining an overlap between the exposure parameters for the regions; and selecting a plurality of exposure parameter values within the overlap for use in inspecting the object, wherein the computation, determination and selection steps are performed by a processor.

9. The method of claim 8, further comprising initializing a radiation source using the selected exposure parameter values to inspect the regions of the object with a single exposure.

10. The method of claim 8, further comprising receiving the x-ray radiation passing though the object using a small area detector.

11. The method of claim 10, wherein the processor is configured to generate the plurality of exposure parameters based on an optimization algorithm that is modeled on a plurality of types of radiation sources.

12. The method of claim 11, wherein the optimization algorithm is modeled using one or more detector responses for the small area radiation detector.

13. The method of claim 8, wherein the fields are adapted to further receive information related to at least one of a type of radiation source, a distance between the radiation source and a radiation detector and a magnification factor.

14. The method of claim 8, wherein a first one of the regions comprises a carbon based composite material and a second one of the regions comprises a metal.

15. The method of claim 8, wherein the second region further comprises a composite material, and wherein the composite material and the metal form vertically arranged layers.

* * * * *

UNITED STATES PATENT AND TRADEMARK OFFICE

CERTIFICATE OF CORRECTION

PATENT NO. : 7,653,175 B2
APPLICATION NO. : 11/864315
DATED : January 26, 2010
INVENTOR(S) : Gordon, III et al.

It is certified that error appears in the above-identified patent and that said Letters Patent is hereby corrected as shown below:

In Column 2, Line 56, delete “perform),” and insert -- preform), --, therefor.

In Column 6, Line 13, in Claim 3, delete “though” and insert -- through --, therefor.

In Column 6, Line 59, in Claim 10, delete “though” and insert -- through --, therefor.

Signed and Sealed this

Seventh Day of December, 2010

David J. Kappos

*Director of the United States Patent and Trademark Office*